US009699819B2

(12) United States Patent
Lee et al.

(10) Patent No.: US 9,699,819 B2
(45) Date of Patent: Jul. 4, 2017

(54) METHOD AND APPARATUS FOR ESTABLISHING SESSION IN WIRELESS COMMUNICATION SYSTEM

(71) Applicant: LG ELECTRONICS INC., Seoul (KR)

(72) Inventors: Wookbong Lee, Seoul (KR); Byungjoo Lee, Seoul (KR); Jinho Kim, Seoul (KR); Dongcheol Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 14/766,593

(22) PCT Filed: Feb. 7, 2014

(86) PCT No.: PCT/KR2014/001052
§ 371 (c)(1),
(2) Date: Aug. 7, 2015

(87) PCT Pub. No.: WO2014/123383
PCT Pub. Date: Aug. 14, 2014

(65) Prior Publication Data
US 2015/0373765 A1    Dec. 24, 2015

Related U.S. Application Data

(60) Provisional application No. 61/762,319, filed on Feb. 8, 2013, provisional application No. 61/762,312, filed
(Continued)

(51) Int. Cl.
*H04W 4/00* (2009.01)
*H04W 76/02* (2009.01)
(Continued)

(52) U.S. Cl.
CPC ......... *H04W 76/023* (2013.01); *H04W 4/206* (2013.01); *H04W 8/005* (2013.01);
(Continued)

(58) Field of Classification Search
None
See application file for complete search history.

(56) References Cited

U.S. PATENT DOCUMENTS

2009/0129283 A1    5/2009 Kwon et al.
2009/0157814 A1    6/2009 Lee et al.
(Continued)

FOREIGN PATENT DOCUMENTS

WO    2011/062404    5/2011
WO    2012/060611    5/2012

OTHER PUBLICATIONS

PCT International Application No. PCT/KR2014/001052, Written Opinion of the International Searching Authority dated May 28, 2014, 17 pages.

*Primary Examiner* — Edan Orgad
*Assistant Examiner* — Rebecca Song
(74) *Attorney, Agent, or Firm* — Lee, Hong, Degerman, Kang & Waimey

(57) ABSTRACT

One embodiment of the present invention relates to a method by which a first device for supporting a WiFi direct service establishes a session, the method including: causing an application service platform (ASP) layer to receive an Advertise Service method from a service layer; causing the ASP layer to receive a REQUEST_SESSION message from a second device; causing the ASP layer to receive a SetSessionReady method from the service layer; and causing the ASP layer to transmit an ADDED_SESSION message to the second device in response to the REQUEST_SESSION message, wherein each of the AdvertiseService method, the
(Continued)

REQUEST_SESSION message, and the ADDED_SESSION message includes port information, and the port information included in the AdvertiseService method is the same as the port information included in the ADDED_SESSION message when the first device gives, to the second device, the port information related to the session.

12 Claims, 10 Drawing Sheets

Related U.S. Application Data on Feb. 8, 2013, provisional application No. 61/763,474, filed on Feb. 12, 2013, provisional application No. 61/768,548, filed on Feb. 25, 2013.

(51) Int. Cl.
| | |
|---|---|
| *H04W 8/00* | (2009.01) |
| *H04W 72/04* | (2009.01) |
| *H04W 48/14* | (2009.01) |
| *H04W 4/20* | (2009.01) |
| *H04W 80/10* | (2009.01) |
| *H04W 84/12* | (2009.01) |

(52) U.S. Cl.
CPC ....... *H04W 48/14* (2013.01); *H04W 72/0406* (2013.01); *H04W 76/025* (2013.01); *H04W 80/10* (2013.01); *H04W 84/12* (2013.01)

(56) References Cited

U.S. PATENT DOCUMENTS

| | | |
|---|---|---|
| 2010/0198952 A1 | 8/2010 | Kneckt et al. |
| 2014/0196125 A1* | 7/2014 | Huang ............... G06F 1/1632 |
| | | 726/5 |
| 2014/0201415 A1* | 7/2014 | Huang ............... G06F 13/00 |
| | | 710/303 |

* cited by examiner (a)

"A" invited "B"

(b)

● Group Owner    ◎ Group Client    ○ Not in group (a)

"A" associated with "B"

(b)

● Group Owner  ◐ Group Client  —✕— Link termination (a)

"A" associated with "B"

(b)

● Group Owner  ◐ Group Client  ⊜ Not in group

"A" associated with "B"

(b)

METHOD AND APPARATUS FOR ESTABLISHING SESSION IN WIRELESS COMMUNICATION SYSTEM

CROSS-REFERENCE TO RELATED APPLICATIONS

This application is the National Stage filing under 35 U.S.C. 371 of International Application No. PCT/KR2014/001052, filed on Feb. 7, 2014, which claims the benefit of U.S. Provisional Application Nos. 61/762,312, filed on Feb. 8, 2013, 61/762,319, filed on Feb. 8, 2013, 61/763,474, filed on Feb. 12, 2013 and 61/768,548, filed on Feb. 25, 2013, the contents of which are all hereby incorporated by reference herein in their entirety.

TECHNICAL FIELD

The present invention relates to a wireless communication system, and more particularly, to a method and apparatus for establishing session in Wi-Fi Direct.

BACKGROUND ART

In recent years, various kinds of wireless communication technologies have been developed together with the developments of the information communication technology. Particularly, wireless LAN (WLAN) is the technology for accessing Internet by wireless in a home, a company or a specific service provided area using such a mobile user equipment as a personal digital assistant (PDA), a laptop computer, a portable multimedia player (PMP) and the like based on a radio frequency technology.

As a direct communication technology for devices to be easily connected with each other without a wireless access point (AP) basically required in a conventional WLAN system, the introduction of Wi-Fi Direct or Wi-Fi P2P (peer-to-peer) has been discussed. According to the Wi-Fi Direct, the devices may be connected with each other without a complex configuration process. Moreover, it may support an operation of exchanging data between the devices at the communication rate of a normal WLAN system in order to provide a user with various kinds of services.

Recently, various kinds of Wi-Fi supporting devices have been used. Among the Wi-Fi supporting devices, the number of Wi-Fi Direct supporting devices capable of communication between the Wi-Fi devices without the AP has been increased. In WFA (Wi-Fi alliance), a technology for introducing a platform supportive of various kinds of services (e.g., send, play, display, print, etc.) using Wi-Fi Direct link has been discussed. It may be named WFDS (Wi-Fi Direct service). According to the WFDS, an application, a service and the like may be controlled or managed by ASP (application service platform) corresponding to a service platform.

DISCLOSURE OF THE INVENTION

Technical Task

The technical task of the present invention is to provide methods for establishing a session, which include a port information delivery in Wi-Fi Direct.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of establishing a session, which is established by a $1^{st}$ device supportive of a Wi-Fi Direct service, including the steps of receiving an AdvertiseService method from a service layer by an ASP (application service platform) layer, receiving a REQUEST_SESSION message from a $2^{nd}$ device by the ASP layer, receiving a SetSessionReady method from the service layer by the ASP layer, and transmitting an ADDED_SESSION message to the $2^{nd}$ device in response to the REQUEST_SESSION message by the ASP layer, wherein at least one selected from the group consisting of the AdvertiseService method, the REQUEST_SESSION message and the ADDED_SESSION message includes a port information and wherein if the $1^{st}$ device needs to inform the $2^{nd}$ device of the port information related to the session, the port information included in the AdvertiseService method is identical to the port information included in the ADDED_SESSION message.

At least one of the following matters may be included in the $1^{st}$ technical aspect of the present invention.

Preferably, the method of establishing the session, which is established by the $1^{st}$ device supportive of the Wi-Fi Direct service may further include the steps of transmitting a session status event set to 'requested' to the service layer after receiving the REQUEST_SESSION message and transmitting a session status event set to 'open' to the service layer after transmitting the ADDED_SESSION message.

More preferably, only the session status event set to 'open' of the session status events may include the port information.

Further preferably, the port information included in the session status event may be identical to the port information included in the ADDED_SESSION message.

Further preferably, if the $2^{nd}$ device needs to inform the $1^{st}$ device of the port information related to the session, the port information included in the session status event may be identical to the port information included in the REQUEST_SESSION message.

Preferably, the $1^{st}$ device corresponds to a service advertiser and the $2^{nd}$ device corresponds to a service seeker.

In a $2^{nd}$ technical aspect of the present invention, provided herein is a method of establishing a session, which is established by a $2^{nd}$ device supportive of a Wi-Fi Direct service, including the steps of receiving a ConnectSessions method from a service layer by an ASP (application service platform) layer, transmitting a REQUEST_SESSION message to a $1^{st}$ device by the ASP layer, and receiving an ADDED_SESSION message from the $1^{st}$ device in response to the REQUEST_SESSION message by the ASP layer, wherein at least one selected from the group consisting of the ConnectSessions method, the REQUEST_SESSION message and the ADDED_SESSION message includes a port information and wherein if the $2^{nd}$ device needs to inform the $1^{st}$ device of the port information related to the session, the port information included in the ConnectSessions method is identical to the port information included in the REQUEST_SESSION message.

At least one of the following matters may be included in the $2^{nd}$ technical aspect of the present invention.

Preferably, the method of establishing the session, which is established by the $2^{nd}$ device supportive of the Wi-Fi Direct service may further include the steps of transmitting a session status event set to 'initiated' to the service layer after transmitting the REQUEST_SESSION message and transmitting a session status event set to 'open' to the service layer after receiving the ADDED_SESSION message.

More preferably, only the session status event set to 'open' of the session status events may include the port information.

Further preferably, the port information included in the session status event may be identical to the port information included in the REQUEST_SESSION message.

Further preferably, if the $1^{st}$ device needs to inform the $2^{nd}$ device of the port information related to the session, the port information included in the session status event may be identical to the port information included in the ADDED_SESSION message.

Preferably, the $1^{st}$ device corresponds to a service advertiser and the $2^{nd}$ device corresponds to a service seeker.

Advantageous Effects

According to the present invention, a port information can be efficiently delivered in a session establishment procedure. Moreover, a port information delivery according to the present invention can be commonly applied to a conventional service and a new service that may appear.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
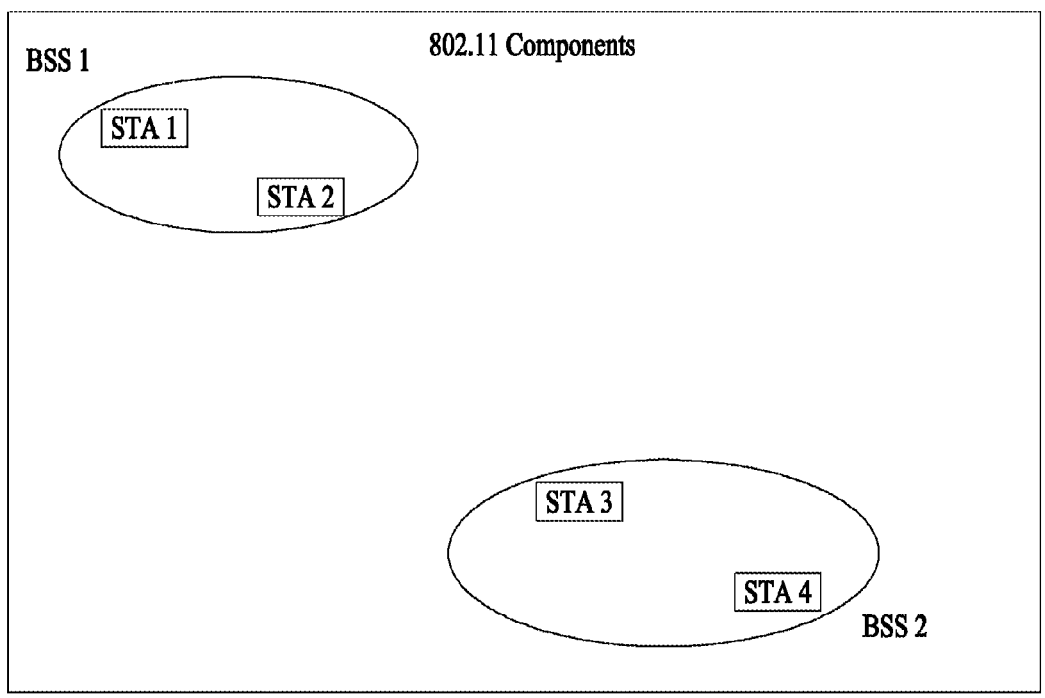
FIG. 1 is a diagram for one example of a structure of IEEE 802.11 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, the present disclosure focuses on the IEEE 802.11 system. However, the technical features of the present invention are not limited thereto.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to higher layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

In addition, FIG. 1 illustrates components such as a Distribution System (DS), a Distribution System Medium (DSM), an Access Point (AP), etc.

In a WLAN, PHYsical layer (PHY) limitations determine a direct station-to-station distance that may be supported. For some networks, this distance may be sufficient, whereas for other networks, communication between STAs farther from each other may be required. To support increased coverage, a DS may be configured.

An architectural component used to interconnect BSSs is the DS. Instead of existing independently, a BSS may also form a component of an extended form of a network that is built with multiple BSSs.

The DS is a logical concept and may be defined by characteristics of the DSM. In this regard, IEEE 802.11 logically separates the Wireless Medium (WM) from the DSM. Each logical medium is used for a different purpose by a different component of the architecture. The IEEE 802.11 definitions neither preclude, nor demand, that the multiple media be either the same or different. Recognizing that the multiple media are logically different is a key to understanding of the flexibility of the architecture. The IEEE 802.11 LAN architecture may be realized in various manners and may be specified independently of the physical characteristics of any specific implementation.

The DS may support mobile devices by providing logical services needed to handle address-to-destination mapping and seamless integration of multiple BSSs.

An AP is an entity that provides access to the DS to associated STAs in addition to acting as an STA. Data may move between a BSS and the DS via an AP. For example, STA2 and STA3 illustrated in FIG. 1 provide access to the DS to associated STAs (STA1 and STA4), having STA functionality. Since all APs are basically STAs, they are addressable entities. Addresses used by an AP for communication on the WM and DSM are not necessarily the same.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Layer Architecture

In the WLAN system, an operation of an STA may be described from the perspective of layer architecture. Layer architecture in terms of device configuration may be implemented by a processor. An STA may have a plurality of layer structures. For example, the 802.11 standard specifications mainly deal with the Medium Access Control (MAC) sublayer of the Data Link Layer (DLL) and the PHY layer. The PHY layer may include a Physical Layer Convergence Protocol (PLCP) entity and a Physical Medium Dependent (PMD) entity. Both the MAC sublayer and the PHY layer conceptually include management entities, called MAC Sublayer Management Entity (MLME) and PHY Layer Management Entity (PLME). These entities provide layer management service interfaces through which layer management functions may be invoked.

In order to provide a correct MAC operation, a Station Management Entity (SME) is present within each STA. The SME is a layer-independent entity that may be viewed as residing in a separate management plane or as residing off to the side. The exact functions of the SME are not specified herein, but in general this entity may be viewed as being responsible for such functions as gathering of information about layer-dependent statuses from various Layer Management Entities (LMEs) and similarly setting of the values of layer-specific parameters. The SME may typically perform such functions on behalf of general system management entities and may implement standard management protocols.

The foregoing entities interact in various ways. For example, the entities may interact with each other by exchanging GET/SET primitives. A primitive refers to a set of elements or parameters related to a specific purpose. An XX-GET.request primitive is used to request the value of a given MIB attribute (management information-based attribute information). An XX-GET.confirm primitive returns an appropriate MIB attribute value if Status="success" and otherwise, returns an error indication in a Status field. An XX-SET.request primitive is used to request that an indicated MIB attribute be set to a given value. If this MIB attribute implies a specific action, then this requests that the action be performed. An XX-SET.confirm primitive confirms that an indicated MIB attribute was set to a requested value, if Status="success," and otherwise, it returns an error condition in the Status field. If this MIB attribute implies a specific action, then this confirms that the action was performed.

The MLME and the SME may exchange various MLME_GET/SET primitives via an MLME_SAP (Service Access Point). Also, various PLMEM_GET/SET primitives may be exchanged between the PLME and the SME via a PLME_SAP and between the MLME and the PLME via an MLME-PLME_SAP.

Evolution of WLAN

The IEEE 802.11 group is working on the standardization of WLAN. IEEE 802.11a and IEEE 802.11b use an unlicensed band in 2.4 GHz or 5 GHz. IEEE 802.11b offers a data rate of 11 Mbps, whereas IEEE 802.11a offers a data rate of 54 Mbps. IEEE 802.11g offers 54 Mbps by applying Orthogonal Frequency Division Multiplexing (OFDM) in 2.4 GHz and IEEE 802.11n offers 300 Mbps by applying Multiple Input Multiple Output-OFMD (MIMO-OFDM). IEEE 802.11n supports a channel bandwidth of up to 40 MHz. In this case, it provides a data rate of 600 Mbps.

In a WLAN environment conforming to IEEE 802.11e, a Direct Link Setup (DLS)-related protocol is based on the premise of a Quality BSS (QBSS) meaning that a BSS supports Quality of Service (QoS). In the QBSS, an AP as well as a non-AP STA is a Quality AP (QAP) supporting QoS. However, even though a non-AP STA is a Quality STA (QSTA) supporting QoS in a current commercialized WLAN environment (e.g., conforming to IEEE 802.11a/b/g), most of APs are legacy APs that do not support QoS. As a result, the DLS service is not available even to a QSTA in the current commercialized WLAN environment.

Tunneled Direct Link Setup (TDLA) is a new wireless communication protocol proposed to overcome this limitation. Although the TDLS does not support QoS, it enables QSTAs to establish direct links even in the current commercialized IEEE 802.11a/b/g WLAN environment and also even in Power Save Mode (PSM). Accordingly, the TDMS specifies an overall procedure for enabling QSTAs to establish direct links even in a BSS managed by a legacy AP. Herein below, a wireless network supporting the TDLS is referred to as a TDLS network.

Wi-Fi Direct Network

A legacy WLAN mainly deals with operations of an infrastructure BSS in which a wireless AP functions as a hub. An AP is responsible for supporting the PHY layer for wireless/wired connectivity, routing for devices in a network, and providing a service to add/remove a device to/from a network. In this case, devices of the network are connected to each other via the AP, not directly.

Standardization of Wi-Fi Direct as a technology supporting direct connectivity between devices is under discussion.

Figure 2:
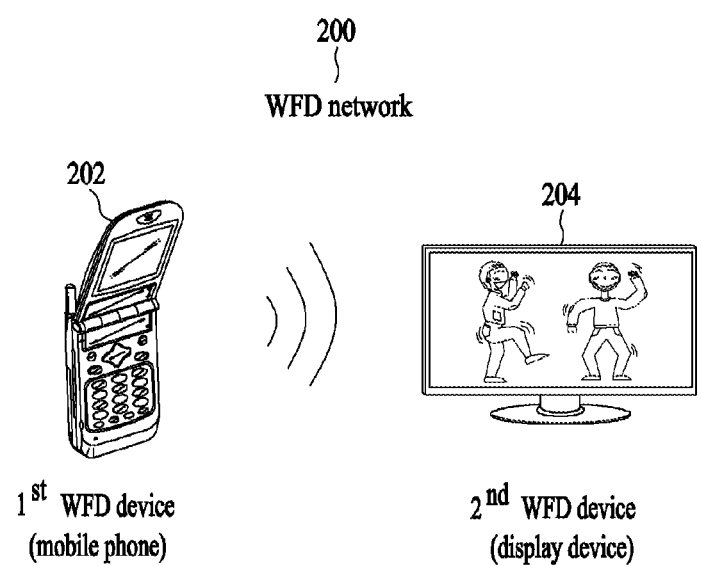
FIG. 2 is a diagram for one example of a Wi-Fi Direct network.

FIG. 2 illustrates an exemplary Wi-Fi Direct network. The Wi-Fi Direct network, which was proposed by the Wi-Fi Alliance (WFA), enables Wi-Fi devices to conduct Device-to-Device (D2D) (or Peer-to-Peer (P2P)) communication without joining a home network, an office network, and a hotspot network. Hereinafter, Wi-Fi Direct-based communication will be referred to as WFD D2D communication (shortly D2D communication) or WFD P2P communication (shortly, P2P communication). Also, a WFD P2P-enabled device will be referred to as a WFD P2P device, or shortly a P2P device.

Referring to FIG. 2, a WFD network 200 may include one or more Wi-Fi devices, for example, a first WFD device 202 and a second WFD device 204. The WFD devices include Wi-Fi-enabled devices such as a display device, a printer, a digital camera, a projector, and a smartphone. Also, the WFD devices include a non-AP STA and an AP STA. In the illustrated example, the first WFD device 202 is a portable phone and the second WFD device 204 is a display device. In the WFD network, WFD devices may be connected directly to each other. Specifically, P2P communication may refer to direct setup of a signal transmission path between two WFD devices without intervention of a third device (e.g., an AP) or a legacy network (e.g., connection to a WLAN via an AP). The signal transmission path established directly between the two WFD devices may be limited to a data transmission path. For example, P2P communication may mean transmission of data (e.g., audio/video/text information, etc.) between a plurality of non-AP STAs without intervention of an AP. A signal transmission path for control information (e.g., resource allocation information for P2P setup, wireless device identification information, etc.) may be established directly between WFD devices (e.g., between a non-AP STA and a non-AP STA or between a non-AP STA and an AP), between two WFD devices (e.g., a non-AP STA and a non-AP STA) via an AP, or between an AP and a WFD device (e.g., between an AP and non-AP STA #1 or between an AP and non-AP STA #2).

Figure 3:
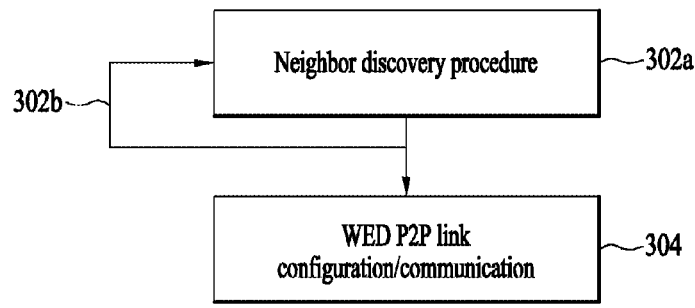
FIG. 3 is a diagram to describe a process for configuring a Wi-Fi Direct network.

FIG. 3 is a flowchart illustrating an operation for configuring a WFD network.

Referring to FIG. 3, the operation for configuring a WFD network may be divided largely into two procedures. One of the procedures is a Neighbor Discovery (ND) procedure (S302a) and the other is a P2P link setup and communication procedure (S304). A WFD device (e.g., the WFD device 202 in FIG. 2) may discover another neighbor WFD device (e.g., the WFD device 204 in FIG. 2) within its (wireless) coverage and may acquire information required for association, for example, pre-association with the WFD device. Herein, pre-association may mean Layer 2 (L2) pre-association in a radio protocol. The information required for pre-association may include, for example, identification information about the neighbor WFD device. The ND procedure may be performed on an available radio channel basis (S302b). Then, the WFD device 202 may perform the WFD P2P link setup/communication procedure with the other WFD device 204. For example, after the WFD device 202 is associated with the neighbor WFD device 204, the WFD device 202 may determine whether the WFD device 204 satisfies a service requirement of a user. For this purpose, the WFD device 202 may search for the WFD device 204 after the L2 pre-association with the WFD device 204. If the WFD device 204 does not satisfy the user's service requirement, the WFD device 202 may release the L2 association with the WFD device 204 and then may set up L2 association with another WFD device. On the other hand, if the WFD device 204 satisfies the user's service requirement, the two WFD devices 202 and 204 may transmit and receive signals via a P2P link.

Figure 4:
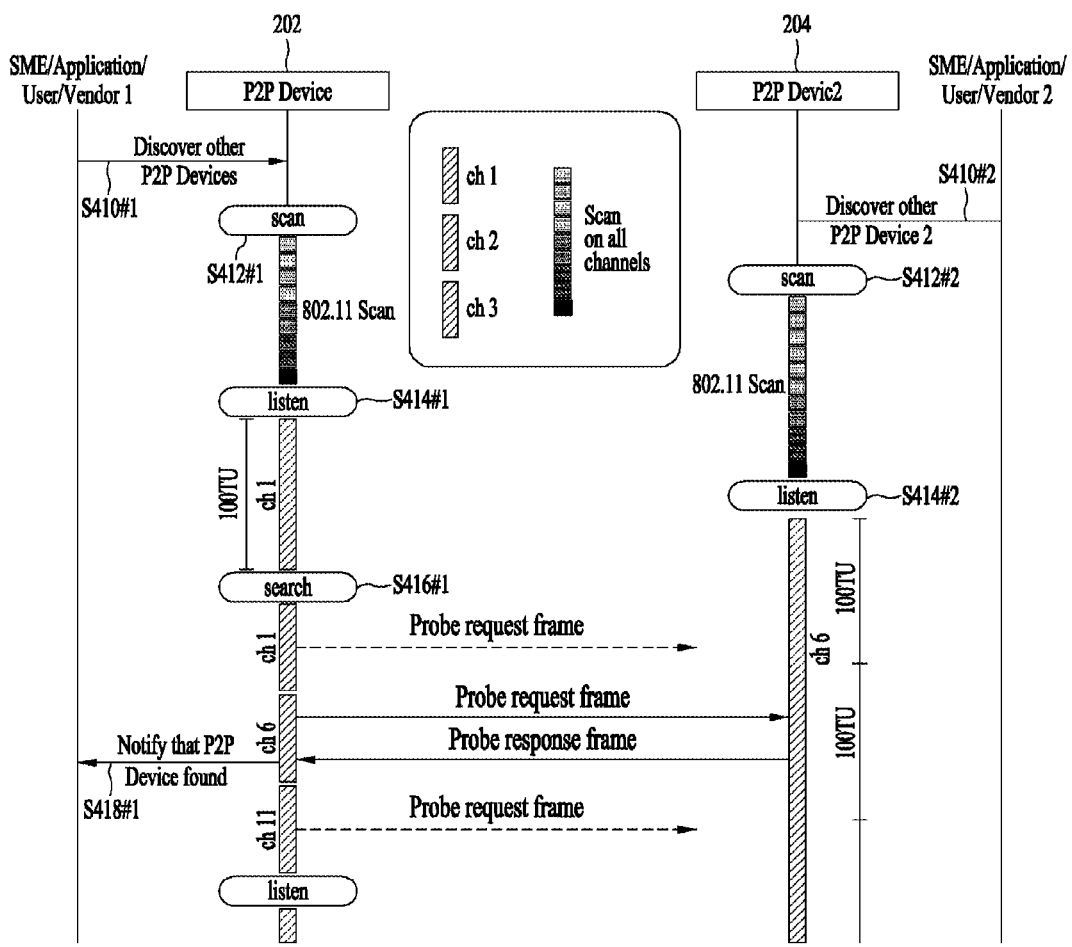
FIG. 4 is a diagram to describe a neighbor discovery procedure.

FIG. 4 is a diagram illustrating a signal flow for the ND procedure. The example of FIG. 4 may be understood as illustrating an operation between the WFD devices 202 and 204 illustrated in FIG. 3.

Referring to FIG. 4, the ND procedure of FIG. 3 may be initiated by a command from an SME/application/user/vender (S410). The ND procedure may be divided into a scan phase (S412) and a find phase (S414 and S416). The scan phase (S412) includes an operation for scanning all available radio channels according to IEEE 802.11. Thus, a P2P device may detect a best operation channel. The find phase (S414 and S416) includes listen mode (S414) and search mode (S416), and the P2P device repeatedly alternates between the listen mode (S414) and the search mode (S416). The P2P devices 202 and 204 perform active search using a probe request frame in the search mode (S416) and may limit a search range to social channels of channels 1, 6, and 11 (e.g., 2412, 2437, and 2462 MHz), for fast search. Also, the P2P devices 202 and 204 select only one of the three social channels and are kept in a reception state in the listen mode (S414). Upon receipt of a probe request frame in the search mode from the other P2P device (e.g., 202), the P2P device (e.g., 204) replies to the transmitting P2P device with a probe response frame. A random listen mode time may be given (e.g., 100, 200, or 300 Time Units (TUs)). The P2P devices may tune to a common channel by repeating the search mode and the reception mode. After a P2P device discovers another P2P device, the P2P device may discover/ exchange a device type, a manufacturer, or a familiar device name using a probe request frame and a probe response frame in order to be selectively associated with the other P2P device. When the P2P device discovers a neighbor P2P device and acquires necessary information from the discovered P2P device by the ND procedure, the P2P device (e.g., 202) may notify the SME/application/user/vendor of the discovery of the P2P device (S418).

At present, P2P communication is used mainly for semi-static communication such as remote printing, photo sharing, etc. Along with the proliferation of Wi-Fi devices and location-based services, P2P communication has gained increasing popularity. For example, it is expected that P2P communication will be used for social chatting (e.g., recognition of a neighbor wireless device and transmission and reception of information to and from the neighbor wireless device by a wireless device subscribed to Social Network Service (SNS)), location-based advertisement, location-based news broadcasting, and game interaction between wireless devices. For the convenience's sake, these P2P applications will be referred to as new P2P applications.

Figure 5:
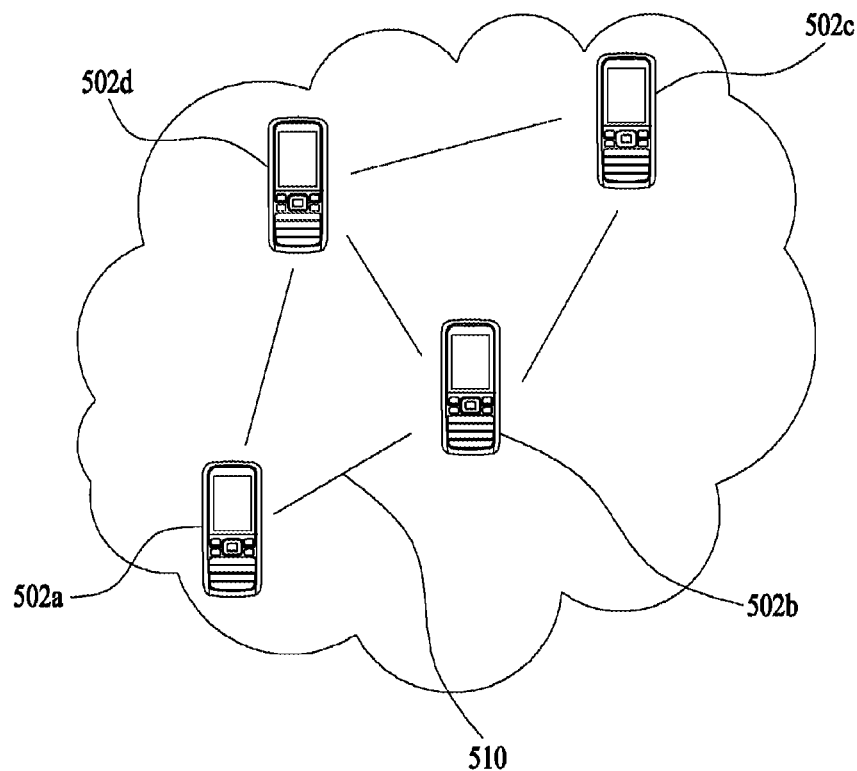
FIG. 5 is a diagram to describe a new aspect of a Wi-Fi Direct network.

FIG. 5 illustrates a new aspect of a WFD network.

The example of FIG. 5 may be understood as a WFD network aspect in the case where a new P2P application (e.g., social chatting, location-based service, and game interaction) is used.

Referring to FIG. 5, a plurality of P2P devices 502a to 502d perform P2P communication (510) in the WFD network. A P2P device(s) that forms the WFD network may be often changed due to movement of the P2P devices(s), or the WFD network may be generated or deleted dynamically/in a short term. As described above, the new P2P applications are characterized in that P2P communication may be conducted and terminated dynamically/in a short term between a large number of P2P devices in a densely populated network environment.

Figure 6:
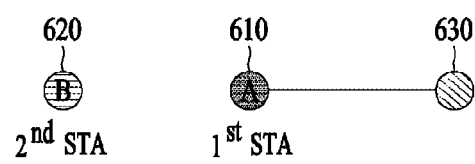
FIG. 6 is a diagram to describe a method of establishing a link for Wi-Fi Direct communication.
Figure 6:
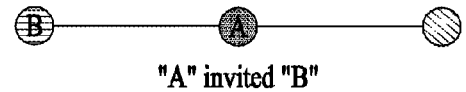

FIG. 6 illustrates a method for establishing a link for WFD communication.

Referring to FIG. 6a, a first STA (hereinafter, referred to as A) 610 is operating as a group owner in legacy WFD communication. When A 610 discovers a new WFD communication target, a second STA (hereinafter, referred to as B) 620 that is not conducting WFD communication during communication with a group client 630 in the legacy WFD communication, A 610 attempts to set up a link with B 620. In this case, since the WFD communication between A 610 and B 620 is new WFD communication and A is a group owner, communication may be set up separately from communication with the legacy group client 630. One WFD group may include one group owner and one or more group clients. As one group owner A 610 is satisfied, a WFD link may be set up as illustrated in FIG. 6b. In this case, A 610 invites B 620 to the legacy WFD communication group. In view of the nature of WFD communication, WFD communication may be possible between A 610 and B 620 and between A 610 and the legacy group client 630, but WFD communication may not be supported between B 620 and the legacy group client 630. If an Intra-BSS option is enabled (or set to On) among Wi-Fi Direct P2P group capabilities, WFD communication (direct communication between clients within the Wi-Fi Direct BSS) may be possible between B 620 and the legacy group client 630.

Figure 7:
FIG. 7 is a diagram to describe a method of associating with a Wi-Fi Direct communication group.
Figure 7:

FIG. 7 is a view referred to for describing a method for associating with a WFD communication group.

Referring to FIG. 7a, a first STA (hereinafter, referred to as A) 710 as a group owner is communicating with a group client 730, and a second STA (hereinafter, referred to as B) 720 as a group owner is communicating with a group client 740. Referring to FIG. 7b, A 710 may terminate the on-going WFD communication and associate with the WFD communication group of B 720. Since B 720 is a group owner, A 710 becomes a group client. It is preferred that A 710 terminates the on-going WFD communication before requesting association to B 720.

Figure 8:
FIG. 8 is a diagram to describe a method of establishing a link for Wi-Fi Direct communication.
Figure 8:

FIG. 8 is a view referred to for describing a method for establishing a link for WFD communication.

Referring to FIG. 8a, a second STA (hereinafter, referred to as B) 820 is operating as a group owner during on-going WFD communication. While B 820 is conducting WFD communication with a group client 830, a first STA (hereinafter, referred to as A) 810 that is not conducting WFD communication and has discovered B 820 attempts to establish a link for new WFD communication with B 820. If B 820 accepts the link setup, a new WFD communication link is established between A 810 and B 820 and thus A 810 operates as a client of the WFD group of B 820. In this case, A 810 has associated with the WFD communication group of B 820. A 810 may conduct WFD communication only with the group owner B 820 and WFD communication may not be supported between A 810 and an existing WFD communication client 830. If an Intra-BSS option is enabled (or set to On) among Wi-Fi Direct P2P group capabilities, WFD communication (direct communication between clients within the Wi-Fi Direct BSS) may be possible between A 810 and the legacy group client 830.

Figure 9:
FIG. 9 is a diagram to describe a method of establishing a link for association with a Wi-Fi Direct communication group.
Figure 9:

FIG. 9 is a view referred to for describing a method for establishing a link that associates with a WFD communication group.

Referring to FIG. 9a, a first STA (hereinafter, referred to as A) 910 as a group client is conducting WFD communication with a group owner 930. Upon discovery of a second STA (hereinafter, referred to as B) 920 as a group owner communicating with a group client by another WFD communication, A 910 may terminate the link with the group owner 930 and join the WFD of B 920.

Wi-Fi Direct Service (WFDS)

WFD is a network connectivity standard technology that defines even link-layer operations. Because no standard is defined for an application operating in a higher layer of a link configured by WFD, when WFD devices are connected to each other and then execute an application, it is difficult to support compatibility. To solve this problem, the WFA is working on standardization of an operation of a higher-layer application called WFDS.

Figure 10:
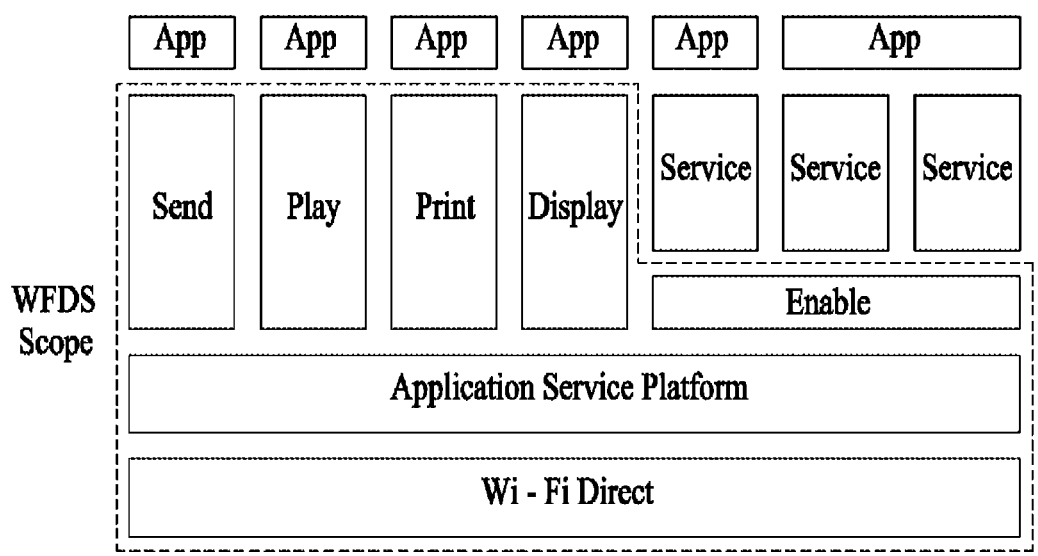
FIG. 10 is a diagram to describe WFDS framework components.

FIG. 10 illustrates components of a WFDS framework.

Referring to FIG. 10, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 10 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (AN), photos, music, etc. between two WFDS devices. Print is a service and application that enable output of text and photos between a device having content such as text, photos, etc. and a printer. Display is a service and application that enable screen sharing between a miracast source and a miracast sink of the WFA.

The Application layer may provide a User Interface (UI), represent information as a human-perceivable form, and provide a user input to a lower layer.

Figure 11:
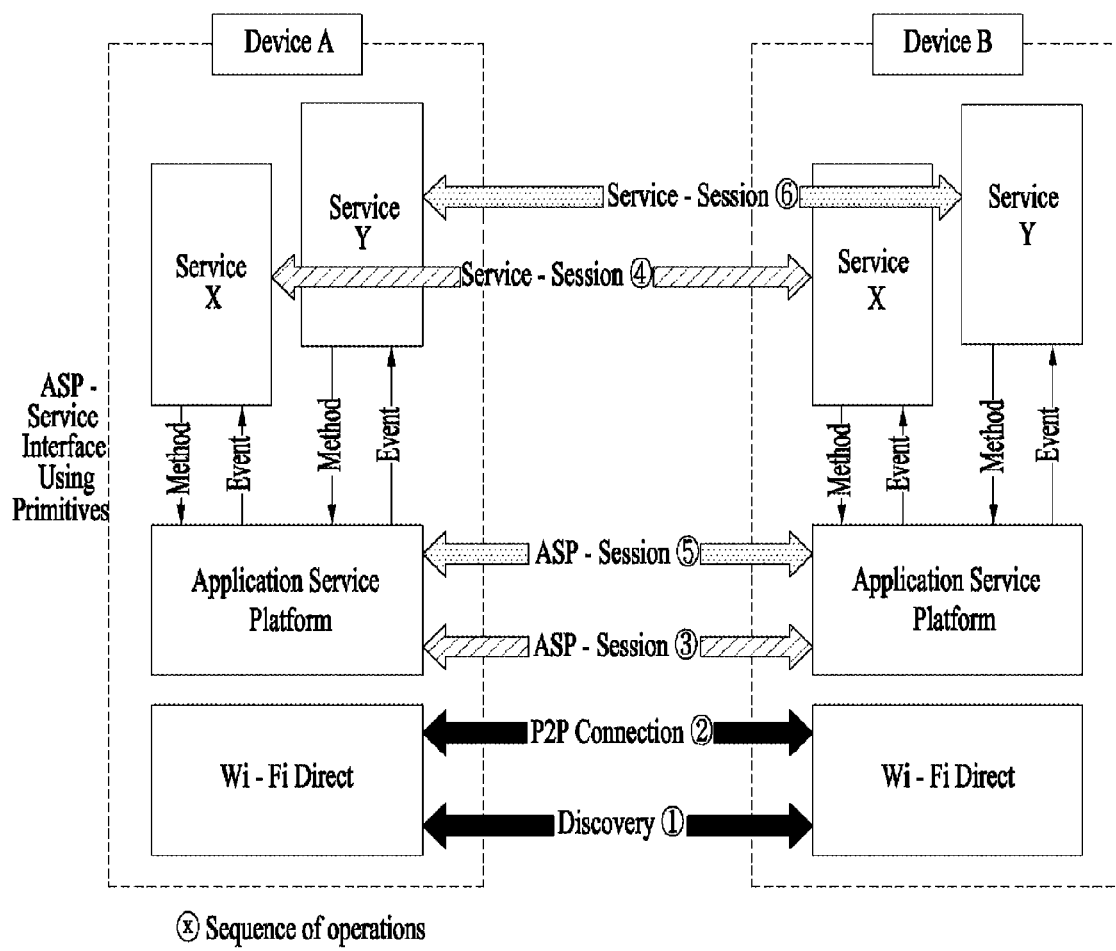
FIG. 11 is a diagram to describe a WFDS operation.

FIG. 11 is a view referred to for describing a WFDS operation.

Referring to FIG. 11, it is assumed that there are two peer devices A and B.

An ASP is a logical entity that executes common functions required for services. These functions may include device discovery, service discovery, ASP-session management, connectivity topology management, security, etc.

An ASP-session is a logical link between the ASPs of devices A and B. To initiate the ASP-session, a P2P connection needs to be set up between the peer devices. The ASP may set up a plurality of ASP-sessions between the two devices. Each ASP-session may be identified by a session Identifier (ID) allocated by an ASP requesting the ASP-session.

A service is a logical entity that provides use case-specific functions to other services or applications using the ASP. A service of one device may communicate with matching services of one or more other devices using a service-specific protocol (it may be defined by a service standard and an ASP protocol).

An interface between the ASP and the service may be defined by Method and Event. Method represents an operation initiated by the service and parameters (or fields) of Method may include information about an operation to be performed. Event provides information from the ASP to the service.

If a user wants to use service X between device A and device B, the ASP of each of the devices generates an ASP-session dedicated to service X between the devices. Then, when the user wants to use service Y, a new ASP-session for the service is established.

Figure 12:
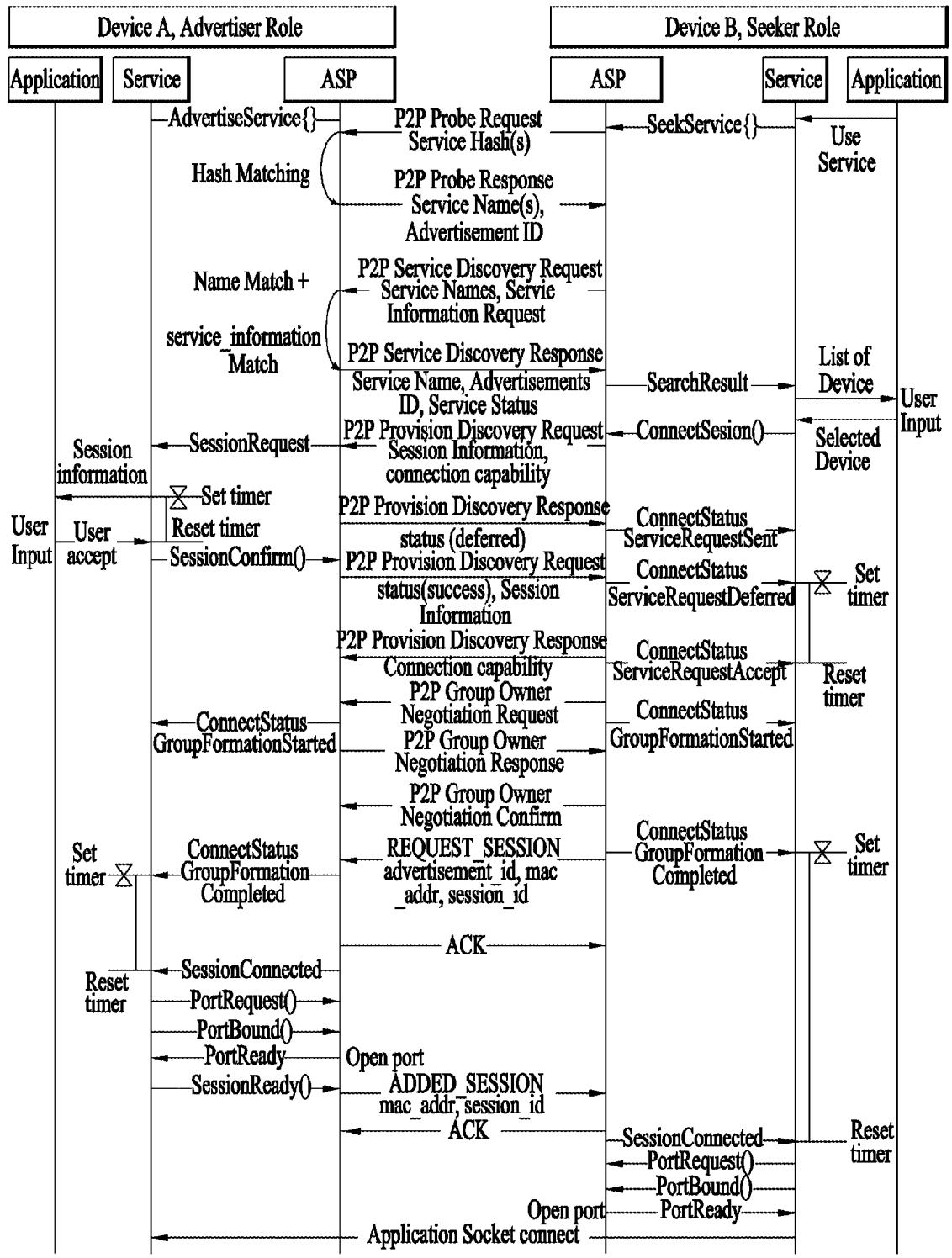
FIG. 12 is a diagram to describe an ASP session setup sequence in WFDM.

FIG. 12 is a view referred to for describing an ASP session setup sequence in WFDS.

When operations are defined between two peer devices in WFDS, one of the peer devices may serve as an advertiser and the other peer device may serve as a seeker. The service seeker discovers a service advertiser(s) and when detecting an intended service, may request a connection to the service advertiser. In the example of FIG. 12, device A serves as an advertiser and device B serves as a service seeker.

The ASP session setup operation of FIG. 12 will be described in brief. A specific service of a WFDS device searches for another WFDS and service, requests the service, and sets up a Wi-Fi Direct connection, and then an application operates.

In FIG. 12, device A may advertise its service and wait for another device to discover the device. The ASP of device A may respond to another device based on information included an Advertisement( ) method provided by the Service layer.

Device B is a device that wants to search for a service and initiate the service. Device B searches for a device supporting the service, upon request of a higher application or a user. Upon receipt of information indicating a Use Service intention from the Application layer, the Service layer of device B may provide the information to the ASP by including information required for a SeekService( ) method.

Therefore, the ASP of device B may transmit a probe request frame to another device. The service name of the service that it wants to detect or it may support may be included in a hashed form in the probe request frame.

Upon receipt of the probe request frame, device A attempts hash matching. If device A supports the service corresponding to the hash value, device A may transmit a probe response frame to device B. A service name, an advertisement ID value, etc. may be included in the probe response frame.

This procedure for exchanging a probe request frame and a probe response frame may be referred to as a device discovery procedure in which devices A and B are identified as WFDS devices and services supported by devices A and B are determined Additionally, devices A and B may exchange information about details of a specific service by a P2P service discovery procedure. For example, device B may transmit information such as a service name (a plurality of service names if support or non-support of a plurality of services are to be determined), a service information request, etc. to device A by a service discovery request message. Then if service information is matched, device A may indicate to device B that the service will be provided. For example, a service discovery response message may include information such as a service name, an advertisement ID, a service status, etc. The service status information indicates whether a service requested by a remote device is available from the service advertiser. This service discovery procedure may be performed by a Generic Advertisement Protocol (GAS) defined by IEEE 802.11u.

Upon completion of the operation requested by the SeekService( ) method requested by the Service layer, the ASP of device B may indicate its result (i.e. SearchResult) to the application and the user by the service.

Up to this time, a Wi-Fi Direct group has not been formed. When the user selects a service and the service performs a session connection (i.e., ConnectSession), a P2P group is formed. Herein, session information and connection capability information are exchanged by a provision discovery request and a provision discovery response.

The session information is hint information that roughly describes the service requested by the service-requesting device. For example, if file transfer is requested, the session information specifies the number of files and file sizes so that the other party may determine whether to accept or reject the service request. The connection capability information may be used in generating a group in a Group Owner (GO) negotiation and P2P invitation procedure.

When device B transmits a provision discovery request message to device A, the ASP of device A transmits a session request (SessionRequest) including service information, etc. to the Service layer and the Service layer transmits the service information to the application/user. If the application/user determines to accept the session based on the session information, the application/user transmits a confirmation (ConfirmService( ) to the ASP through the Service layer.

During the time, the ASP of device A transmits a provision discovery response message to device B. Status may be set to Deferred in the provision discovery response message. This is done to indicate that the service is not accepted immediately and reception of a user input is awaited. Accordingly, the ASP of device B may indicate to the Service layer that the service request is deferred, while transmitting a ConnectStatus event.

Upon receipt of ConfirmService( ) at the ASP of device A, device A may perform a follow-on provision discovery procedure. That is, device A may transmit a provision discovery request message to device B. This may be referred to as the follow-on provision discovery procedure. This message may include service information together with information indicating that the status of the service is success. Therefore, the ASP of device B may indicate to the Service layer that the service request has been accepted, while transmitting a ConnectStatus event to the Service layer. Also, the ASP of device B may transmit a provision discovery response message to device A. The provision discovery response message may include connection capability information.

After the P2P provision discovery procedure, a P2P group is created and an L2 connection and an Internet protocol (IP) connection are established by the GO negotiation or invitation procedure. A detailed description of the GO negotiation procedure will not be given herein.

After the P2P connection or the IP connection is created by completion of the GO negotiation, devices A and B transmit a REQUEST_SESSION message requesting a session by an ASP coordination protocol. The REQUEST_SESSION message may include an advertisement ID, a MAC address (mac_addr), and a session ID. The MAC address is an address of a P2P device. Device A may transmit an ACK message to device B in response to the REQUEST_SESSION message.

Upon receipt of the ACK message, device A may indicate the session connection to a higher-layer service/application and the Service layer may request port information about the session and bind the session with a port. Accordingly, the ASP may open the port (the ASP may open the port within a firewall) and indicate to the Service layer that the port is ready. The Service layer may indicate to the ASP that the session is ready (SessionReady( )).

Therefore, the ASP of device A transmits an ADDED_SESSSION message to the other device. The ADDED_SESSSION message may include the session ID and the MAC address information. Thus, the service may be uniquely identified. Upon receipt of the ADDED_SESSION message, the ASP of device B may indicate the session connection to the Service layer and also may indicate to the Service layer that a port is ready (PortReady( )) through port request and port binding. The ASP may open the port within the firewall.

Subsequently, an application socket connection between the Service layers of devices A and B may be indicated.

Since the ASP session is established in the above procedures, individual service-specific operations (for example, send, play, etc.) may be performed.

Wi-Fi Direct communication may be performed between devices based on the above-mentioned descriptions. Each port used in this case may be determined in accordance with a service. Particularly, in case of a send service and a play service, it has been determined as port 1900. In case of a print service, a port information is delivered through a service discovery response. In case of a display service, the port information is delivered through WFD IE i.e., L2 layer. In particular, a port number is previously determined per service or each port information is delivered individually, for example, through L2 layer (in case of a display miracast).

In case of the display service among the above-mentioned services, if a session is established in infrastructure mode, the necessity of transmitting the port information through the WFD IE is low. Moreover, in case of a new service except the predefined services, a method of transmitting the port information is ambiguous. Therefore, explained in the following is a method of transmitting the port information, which is applicable to the conventional services and Enable service that may be newly defined. In the following description, a $1^{st}$ device (shown as device A in the drawings) may mean a service advertiser and a $2^{nd}$ device (shown as device B in the drawings) may mean a service seeker. The steps/process not mentioned in the following description (session establishment procedure) especially may be referred to by the above-mentioned descriptions or 'Wi-Fi Direct Services Draft Technical Specification, Version 0.5'.

$1^{st}$ Embodiment

Figure 13:
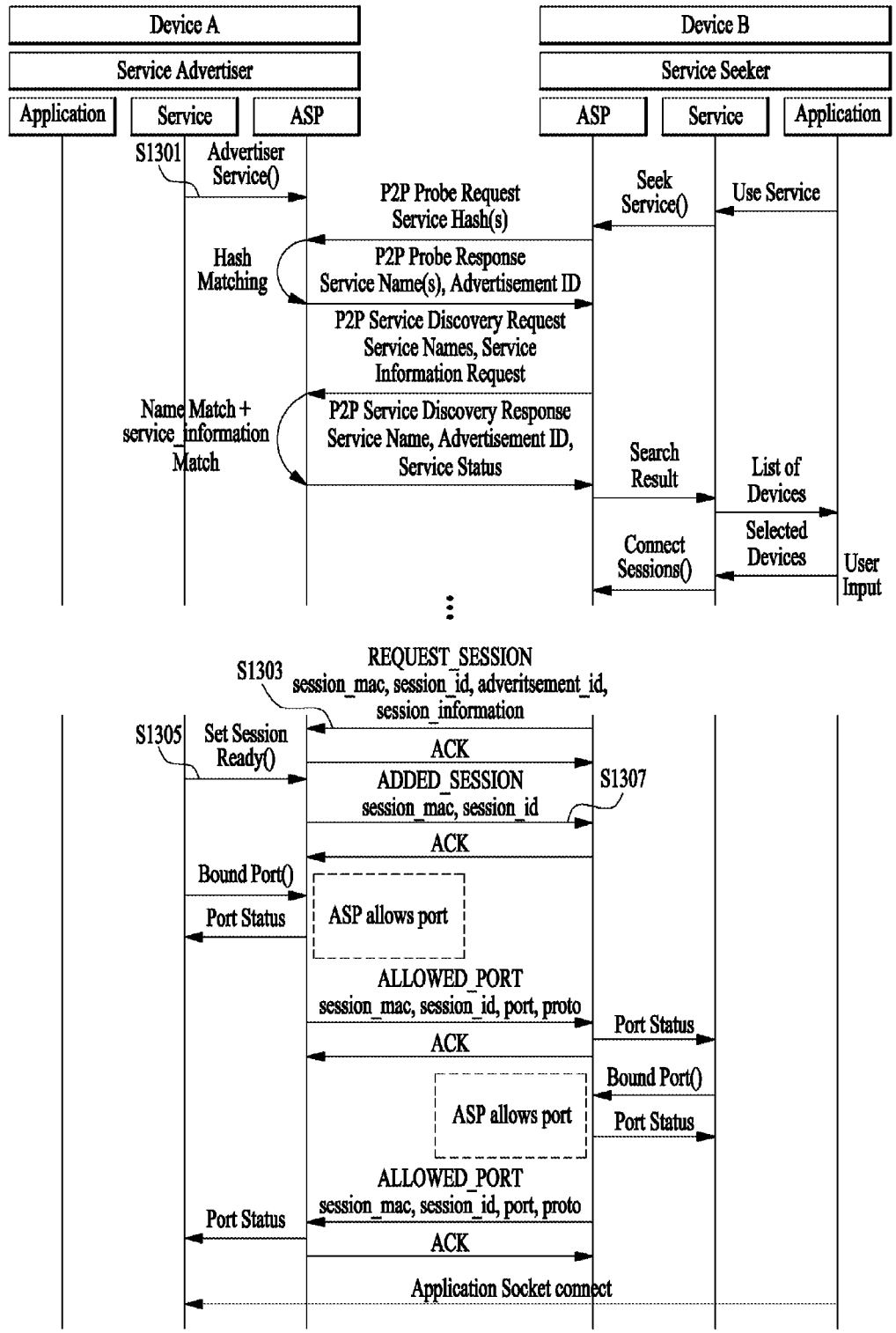
FIGS. 13 to 14 are diagrams to describe a session establishment procedure according to an embodiment of the present invention.

FIG. 13 shows one embodiment of the present invention. Referring to FIG. 13, an ASP layer of a $1^{st}$ device may receive an AdvertiseService method from a service layer for initial session establishment in a step S1301. Subsequently, the $1^{st}$ device (i.e., ASP layer) may receive a REQUEST_SESSION message in a step S1303 and the ASP layer may receive a SetSessionReady method from the service layer in a step S1305. The ASP layer may transmit an ADDED_SESSION message to a $2^{nd}$ device in response to the REQUEST_ SESSION message in a step S1307. In the steps, if the $1^{st}$ device is already associated with the $2^{nd}$ device, i.e., in case of a post-association, an information delivered through the step S1301 may be obtained from the post-association.

In each of the above steps for session establishment, at least one selected from the group consisting of the AdvertiseService method, the REQUEST_SESSION message and the ADDED_SESSION message may include a port information. More particularly, in case that the $1^{st}$ device needs to inform the $2^{nd}$ device of the port information related to the session, the port information included in the AdvertiseService method may be identical to that included in the ADDED_SESSION message.

Thus, the REQUEST_SESSION message may correspond to Table 1 in the following description.

TABLE 1

| Field | Size (octets) | Value | Description |
| --- | --- | --- | --- |
| Opcode | 1 | 0x00 | Opcode as defined in Table 3-2. |
| Sequence number | 1 | Variable | Sequence number is assigned at transmission time. |

TABLE 1-continued

| Field | Size (octets) | Value | Description |
|---|---|---|---|
| session_mac | 6 | Variable | MAC address used in combination with the session_id to uniquely identify an ASP-Session. |
| session_id | 4 | Variable | ID used in combination with session_mac to uniquely identify an ASP-Session. Assigned by the ASP sending this message. |
| advertisement_id | 4 | Variable | Identifier used in combination with session_mac to uniquely identify an ASP-Session. Assigned by the ASP sending this message. |
| session_information_length | 1 | Variable (0-144) | Length of the session_information field (number of octets) |
| session_information | Variable (0-144) | Variable | session_information data if received in the ConnectSessions Method. |
| port | 2 | Variable | Port number for service session (Port the service will be listening on, for incoming IP connections.) |
| proto | 1 | Variable | Protocol identifier |

Moreover, the ADDED_SESSION message may correspond to Table 2 in the following description.

TABLE 2

| Field | Size (octets) | Value | Description |
|---|---|---|---|
| Opcode | 1 | 0x01 | Opcode as defined in Table 3-2. |
| Sequence number | 1 | variable | Sequence number is assigned at transmission time. |
| session_mac | 6 | variable | MAC address used in combination with the session_id to uniquely identify an ASP-Session. Value received in the corresponding REQUEST_SESSION message. |
| session_id | 4 | variable | Identifier used in combination with session_mac to uniquely identify an ASP-Session. This value is received in the corresponding REQUEST_SESSION message. |
| port | 2 | Variable | Port, the service will be listening on, for incoming IP connections. |
| proto | 1 | Variable | Protocol identifier |

$2^{nd}$ Embodiment

Figure 14:
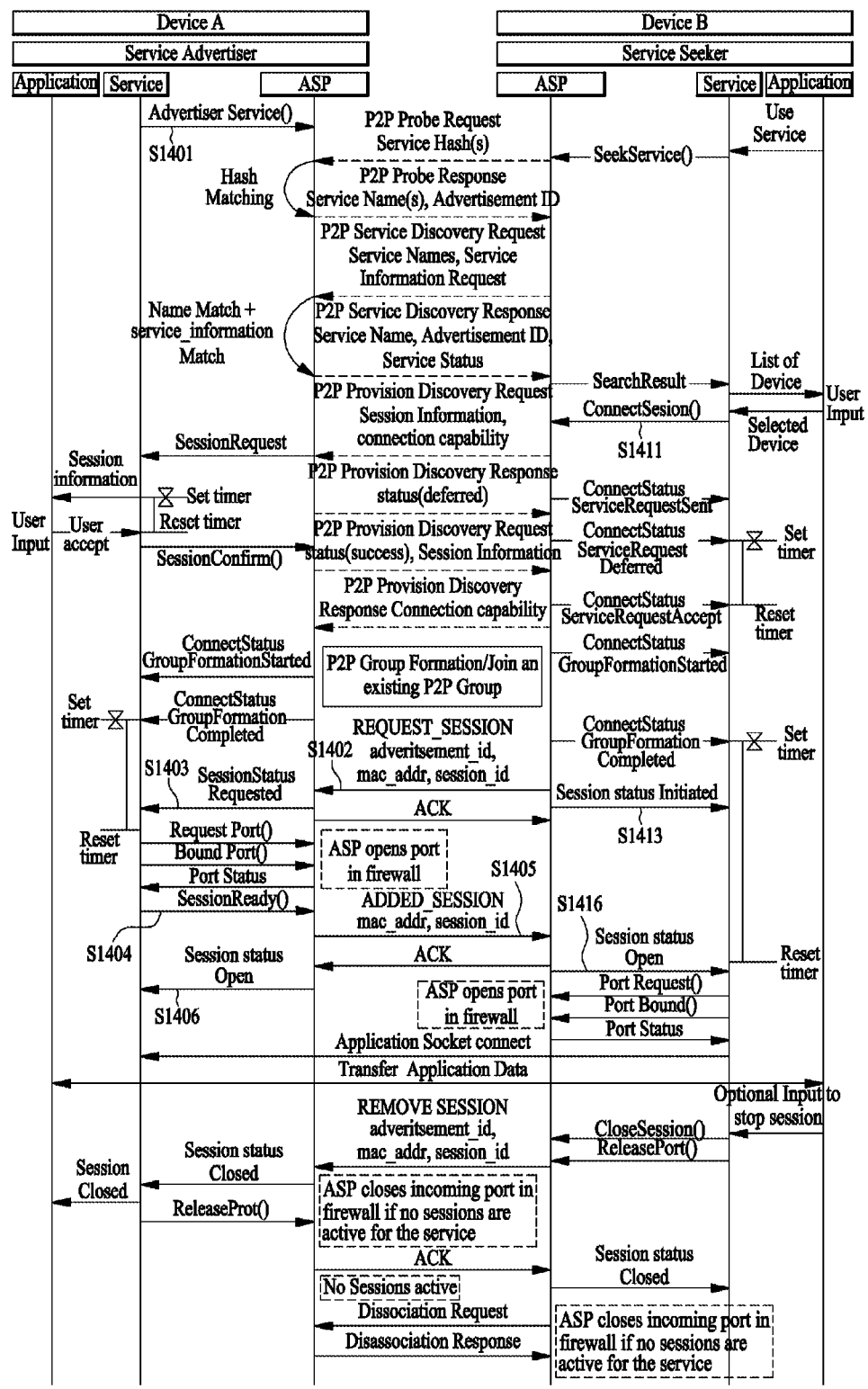

FIG. 14 shows a $2^{nd}$ embodiment. Referring to FIG. 14, an ASP layer may receive of a $1^{st}$ device may receive an AdvertiseService method from a service layer for initial session establishment in a step S1401. The $1^{st}$ device (i.e., ASP layer) may receive a REQUEST_SESSION message in a step S1402. The ASP layer may transmit a session status event (SessionStatus) set to 'requested' to the service layer in a step S1403. Subsequently, the ASP layer may receive a SetSessionReady method from the service layer in a step S1404. The ASP layer may transmit an ADDED_SESSION message to a $2^{nd}$ device in response to the REQUEST_SESSION message in a step S1405. The ASP layer may transmit a session status event set to 'open' to the service layer in a step S1406.

In the steps, in case that the $1^{st}$ device is already associated with the $2^{nd}$ device, i.e., in case of a post-association, an information delivered through the step S1401 may be obtained from the post-association.

In each of the above steps for session establishment, at least one selected from the group consisting of the AdvertiseService method, the REQUEST_SESSION message, the ADDED_SESSION message and the session status event may include a port information. In this case, only the session status event set to 'open' of the session status events may include the port information.

If the $1^{st}$ device needs to inform the $2^{nd}$ device of the port information related to the session, the port information included in the AdvertiseService method may be identical to that included in the ADDED_SESSION message. And, this port information may be identical to the port information included in the session status event set to 'open'. In other words, the port information initially transmitted from the service side is delivered to the $2^{nd}$ device through the ADDED_SESSION message and the port information is delivered back to the service side from the ASP side.

If the $2^{nd}$ device needs to inform the $1^{st}$ device of the port information related to the session, the port information included in the session status event may be identical to that included in the REQUEST_SESSION message. In other words, in case that the $2^{nd}$ device needs to play a role of informing the $1^{st}$ device of the port information related to the above session, the port information used in both of the $1^{st}$ and $2^{nd}$ devices is delivered from the $2^{nd}$ device through the REQUEST_SESSION message. In this case, the port information included in the REQUEST_SESSION message may be received by an ASP layer of the $2^{nd}$ device from a service layer through a ConnectSessions method. In particular, the above port information may be commonly included in the REQUEST_SESSION message and the ConnectSessions method.

The embodiment of the present invention is described in aspect of the $2^{nd}$ device in the following. Referring back to FIG. 14, the ASP layer may receive the ConnectSessions method from the service layer in a step S1411. The ASP layer may transmit the REQUEST_SESSION message to the $1^{st}$ device in the step S1402. Moreover, the ASP layer may transmit a session status event set to 'initiated' to the service layer in a step S1413. The ASP layer receives the ADDED_SESSION message from the $1^{st}$ device in the step S1405 and may then transmit the session status event set to 'open' in a step S1416.

In each of the above-mentioned steps, at least one selected from the group consisting of the ConnectSessions method, the REQUEST_SESSION message and the ADDED_SESSION message may include the port information and only the session status event set to 'open' of the session status events may include the port information. In this case, if the $2^{nd}$ device needs to inform the $1^{st}$ device of the port information related to the session, the port information included in the ConnectSessions method may identical to that included in the REQUEST_SESSION message. Moreover, the common port information may be identical to the port information included in the session status event set to 'open'. On the contrary, if the $1^{st}$ device needs to inform the $2^{nd}$ device of the port information related to the session, the port information included in the session status event may be identical to that included in the REQUEST_SESSION message. In other words, in case that the $2^{nd}$ device needs to inform the $1^{st}$ device of the port information in session establishment, the port information is delivered from the service layer of the $2^{nd}$ device through the ConnectSessions method and then delivered to the $1^{st}$ device from the ASP layer through the REQUEST_SESSION message.

On the other hand, in FIG. 14, each of P2P service discovery request and response procedures corresponds to a selective procedure except a case that prefix search or a service information request does not correspond to NULL. However, a request for a service status needs to be made in some cases even through it does not correspond to the above-mentioned case. Therefore, an information (status_check) indicating whether the discovery request and response procedures should be necessarily performed may be included in a SeekService( ) method transmitted from the service layer of the $2^{nd}$ device. In this case, if the status_check value corresponds to TRUE, the ASP layer should necessarily perform the service discovery request in order to be aware of the service status.

Meanwhile, if the $2^{nd}$ user equipment is already aware of a MAC address of the $1^{st}$ user equipment since the $2^{nd}$ user equipment has associated with the $1^{st}$ user equipment, it may not be necessary to transmit a probe request. If a MAC address parameter in the SeekService( ) method corresponds to NULL, a service seeker shall transmit the probe request by periods before CancelSeekService method (SearchTerminatedEvent) after having called the SeekService( ) method. Alternatively, if the MAC address parameter in the SeekService( ) method does not correspond to NULL, the service seeker may transmit the probe request by periods before CancelSeekService method (SearchTerminatedEvent) after having called the SeekService( ) method. In this case, a service hash may be included in the probe request.

Figure 15:
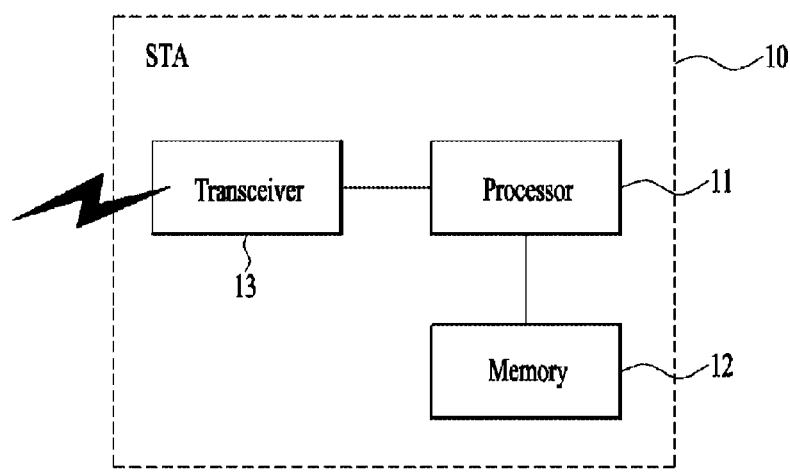
FIGS. 15 to 16 are block diagrams for a configuration of a wireless device according to one embodiment of the present invention.

FIG. 15 is a block diagram for one configuration of a wireless device according to one embodiment of the present invention.

Referring to FIG. 15, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Moreover, a module for implementing the operations of the wireless device according to the various embodiments of the present invention mentioned in the foregoing description may be saved in the memory 12 and then driven by the processor 11. The memory 12 may be included inside or outside the processor 11 and then connected to the processor 11 via a means known well to the public.

The wireless device 10 shown in FIG. 15 can be configured to support Wi-Fi Direct service and to perform session setup. The processor 11 can be configured to set up a P2P (peer-to-peer) connection between a $1^{st}$ wireless device and a $2^{nd}$ wireless device, which includes a provision discovery procedure between the $1^{st}$ wireless device and the $2^{nd}$ wireless device, in order to create a session on a $1^{st}$ service. The processor 11 can be configured to control the transceiver 13 to transmit the REQUEST_SESSION message from the $1^{st}$ wireless device to the $2^{nd}$ wireless device (or to receive the REQUEST_SESSION message in case of the wireless device 10 corresponding to the $2^{nd}$ wireless device) in order to create a session on a $2^{nd}$ service. The session information on the $2^{nd}$ service may be included in the REQUEST_SESSION message.

A specific configuration of the wireless device 10 shown in FIG. 15 can be implemented so that the matters mentioned in the foregoing descriptions of various embodiments of the present invention are applied independently or at least two embodiments of the present invention are applied simultaneously. And, redundant explanation will be omitted for clarity.

Figure 16:
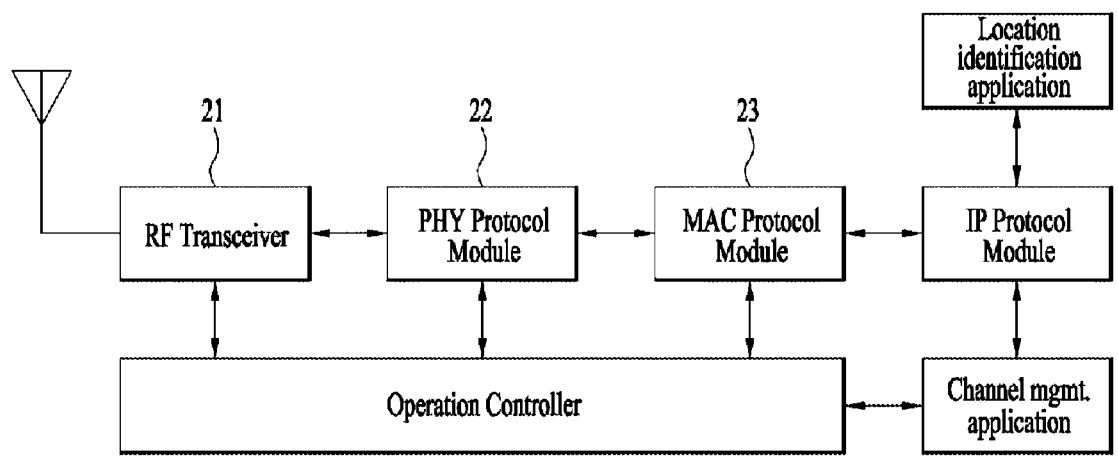

FIG. 16 is a block diagram for another configuration of a wireless device according to one embodiment of the present invention.

Referring to FIG. 16, an RF transceiver 21 moves an information created by a PHY protocol module 22 to an RF spectrum and then transmits the information through an antenna by performing filtering/amplification. Alternatively, the RF transceiver 21 moves an RF signal received through the antenna to a band that can be processed by the PHY protocol module. To this end, the RF transceiver 21 is in charge of managing a process such as filtering or the like. The RF transceiver 21 may include a switching function for switching between the transmitting and receiving functions.

The PHY module 22 performs a role of transferring data to the RF transceiver 21 in a manner of performing a processing such as FEC encoding and modulation, insertion of additional signals such as a preamble and a pilot, or the like on data of which transmission is requested by an MAC protocol module 23. And, the PHY module 22 performs a role of transferring data to the MAC protocol module 23 through a process for performing demodulation, equalization, FEC decoding, elimination of the signal added in the PHY layer, and the like on a reception signal delivered from the RF transceiver 21 at the same time. To this end, a modulator, a demodulator equalizer, an FEC encoder, an FEC decoder and the like may be included in the PHY protocol module 22.

The MAC protocol module 23 performs a process necessary to transfer or transmit data transferred from an upper layer to the PHY protocol module 22 and is charge of additional transmissions in order to perform basic communication. To this end, the MAC protocol module 23 processes data, of which transmission is requested by the upper layer, to be appropriate for transmission and then transfers or transmits the processed data to the PHY protocol module 22. And, the MAC protocol module 23 processes reception data transferred from the PHY protocol module 22 and performs a role of transferring the processed data to the upper layer. Moreover, the MAC protocol module 23 is also in charge of processing a communication protocol by being responsible for other additional transmissions and receptions necessary for data transfer.

The Embodiments of the present invention mentioned in the foregoing description can be implemented using various means. For instance, the embodiments of the present invention can be implemented using hardware, firmware, software and/or any combinations thereof In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

Although the various embodiments of the present invention are mainly described with reference to the examples of applying to IEEE 802.11 system, as mentioned in the foregoing description, the embodiments can identically apply to various kinds of mobile communication systems as well as to the IEEE 802.11 system.

What is claimed is:

1. A method of establishing a session, which is established by a $1^{st}$ device supportive of a Wi-Fi Direct service, the method comprising:
receiving an AdvertiseService method from a service layer by an ASP (application service platform) layer;
receiving a REQUEST_SESSION message from a $2^{nd}$ device by the ASP layer;
receiving a SetSessionReady method from the service layer by the ASP layer; and
transmitting an ADDED_SESSION message to the $2^{nd}$ device in response to the REQUEST_SESSION message by the ASP layer,
wherein each of the AdvertiseService method, the REQUEST_SESSION message, and the ADDED_SESSION message comprises port information, and
wherein if the $1^{st}$ device needs to inform the $2^{nd}$ device of the port information related to the session, the port information included in the AdvertiseService method is identical to the port information included in the ADDED_SESSION message.

2. The method of claim 1, further comprising:
transmitting a session status event set to 'requested' to the service layer after receiving the REQUEST_SESSION message; and
transmitting a session status event set to 'open' to the service layer after transmitting the ADDED_SESSION message.

3. The method of claim 2, wherein only the session status event set to the 'open' of the session status events comprises the port information.

4. The method of claim 3, wherein the port information included in the session status event is identical to the port information included in the ADDED_SESSION message.

5. The method of claim 3, wherein if the $2^{nd}$ device needs to inform the $1^{st}$ device of the port information related to the session, the port information included in the session status event is identical to the port information included in the REQUEST_SESSION message.

6. The method of claim 1, wherein the $1^{st}$ device comprises a service advertiser and wherein the $2^{nd}$ device comprises a service seeker.

7. A method of establishing a session, which is established by a $2^{nd}$ device supportive of a Wi-Fi Direct service, the method comprising:
receiving a ConnectSessions method from a service layer by an ASP (application service platform) layer;
transmitting a REQUEST_SESSION message to a $1^{st}$ device by the ASP layer; and
receiving an ADDED_SESSION message from the $1^{st}$ device in response to the REQUEST_SESSION message by the ASP layer,
wherein each of the ConnectSessions method, the REQUEST_SESSION message, and the ADDED_SESSION message comprises port information, and
wherein if the $2^{nd}$ device needs to inform the $1^{st}$ device of the port information related to the session, the port information included in the ConnectSessions method is identical to the port information included in the REQUEST_SESSION message.

8. The method of claim 7, further comprising:
transmitting a session status event set to 'initiated' to the service layer after transmitting the REQUEST_SESSION message; and
transmitting a session status event set to 'open' to the service layer after receiving the ADDED_SESSION message.

9. The method of claim 8, wherein only the session status event set to the 'open' of the session status events comprises the port information.

10. The method of claim 9, wherein the port information included in the session status event is identical to the port information included in the REQUEST_SESSION message.

11. The method of claim 9, wherein if the $2^{nd}$ device needs to inform the $1^{st}$ device of the port information related to the session, the port information included in the session status event is identical to the port information included in the ADDED_SESSION message.

12. The method of claim 7, wherein the $1^{st}$ device comprises a service advertiser and wherein the $2^{nd}$ device comprises a service seeker.

* * * * *